Aug. 23, 1932.    L. C. SHIPPY ET AL    1,873,224
CAM GRINDING FIXTURE
Filed Nov. 19, 1930    7 Sheets-Sheet 1
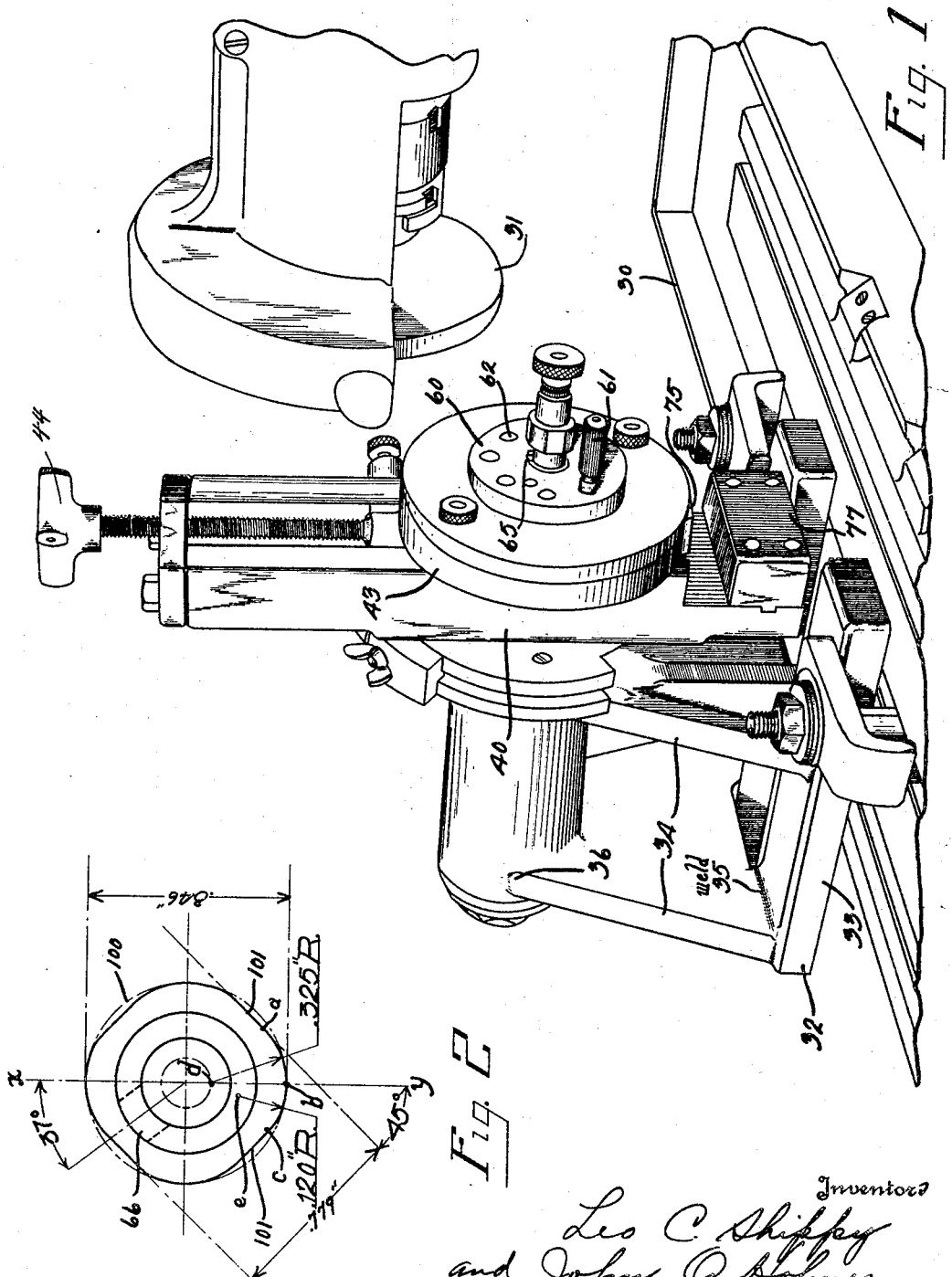
Inventors
Leo C. Shippy
and John O. Holmes
By Spinner Hardway & Fehr
Their Attorneys

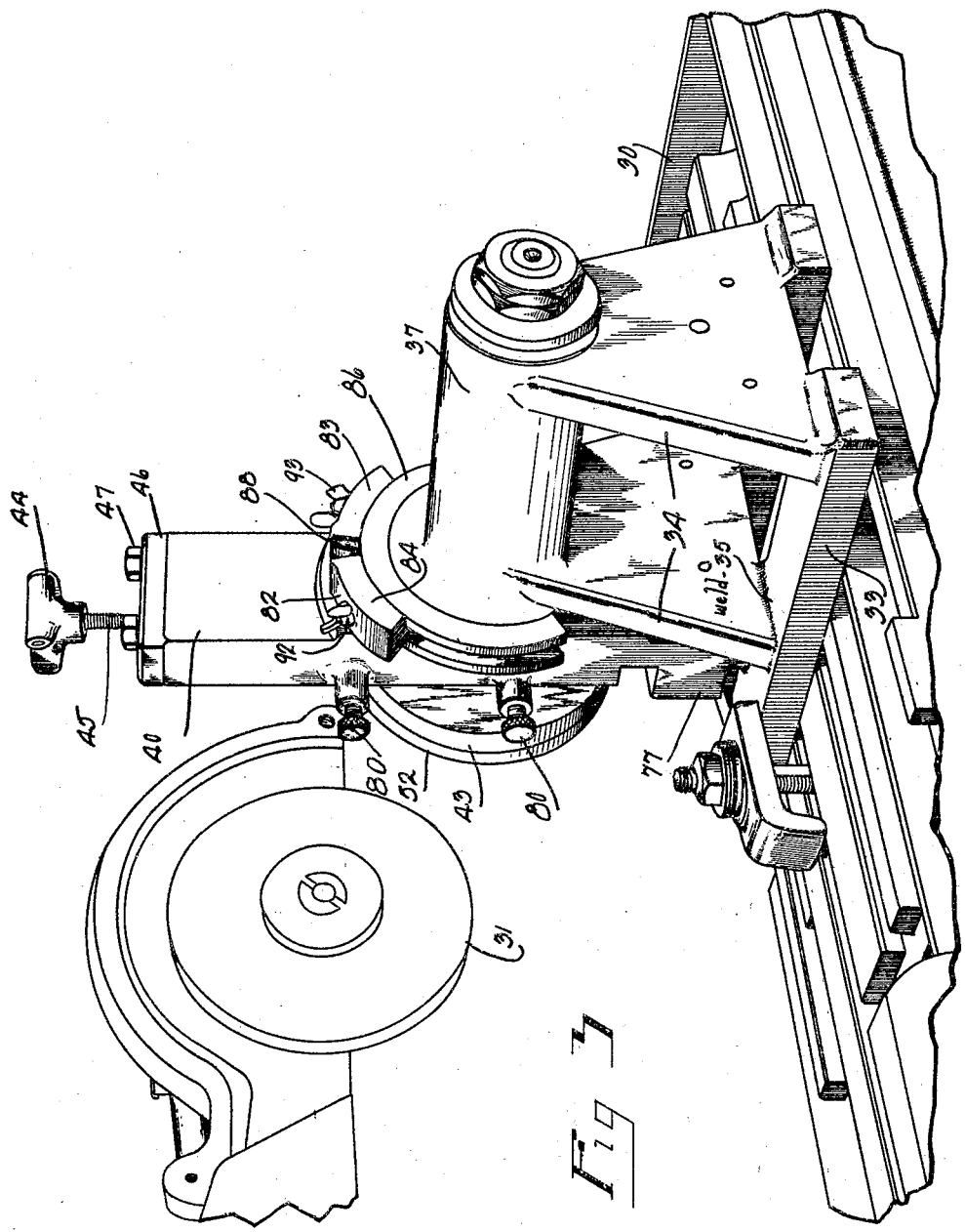

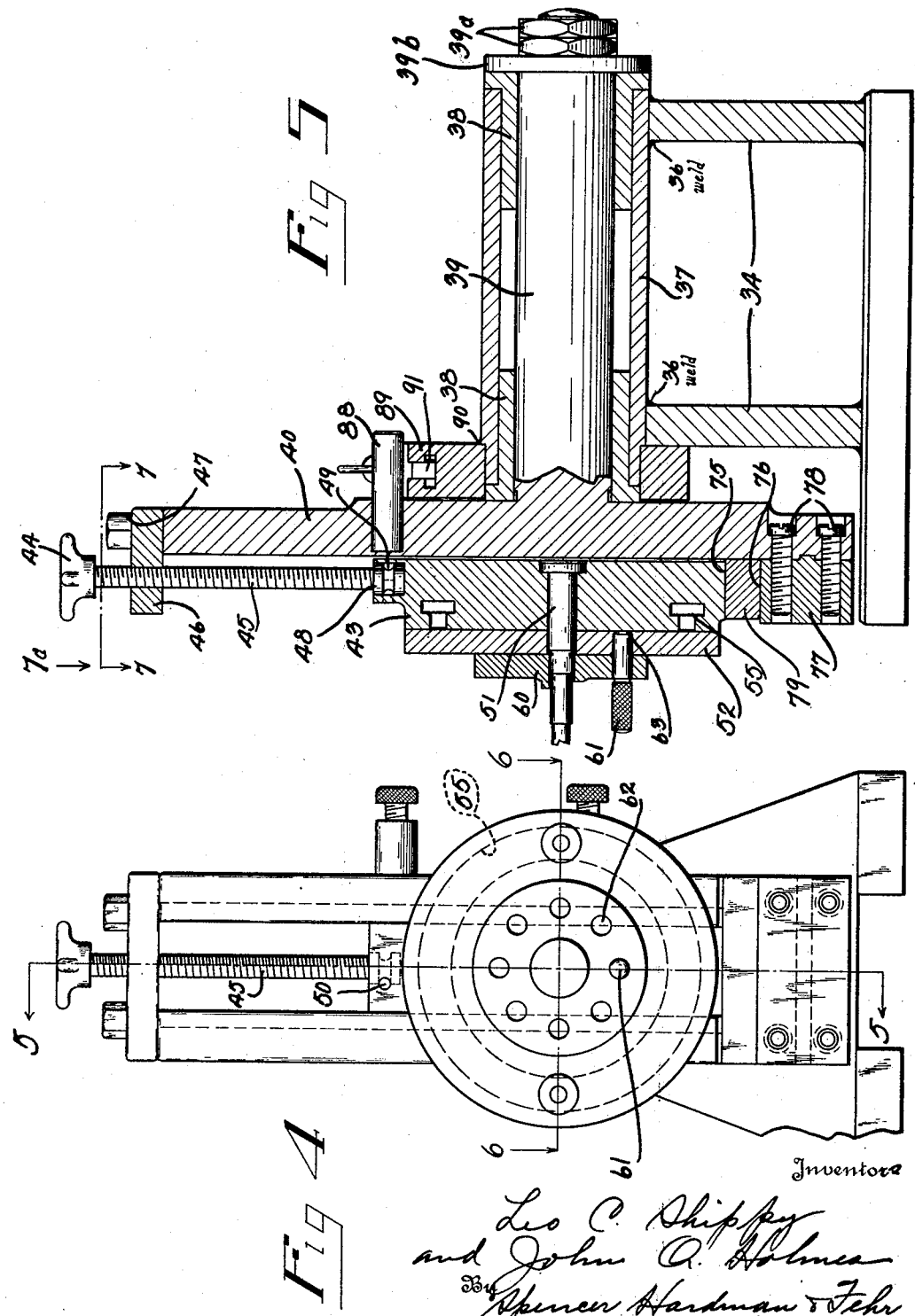

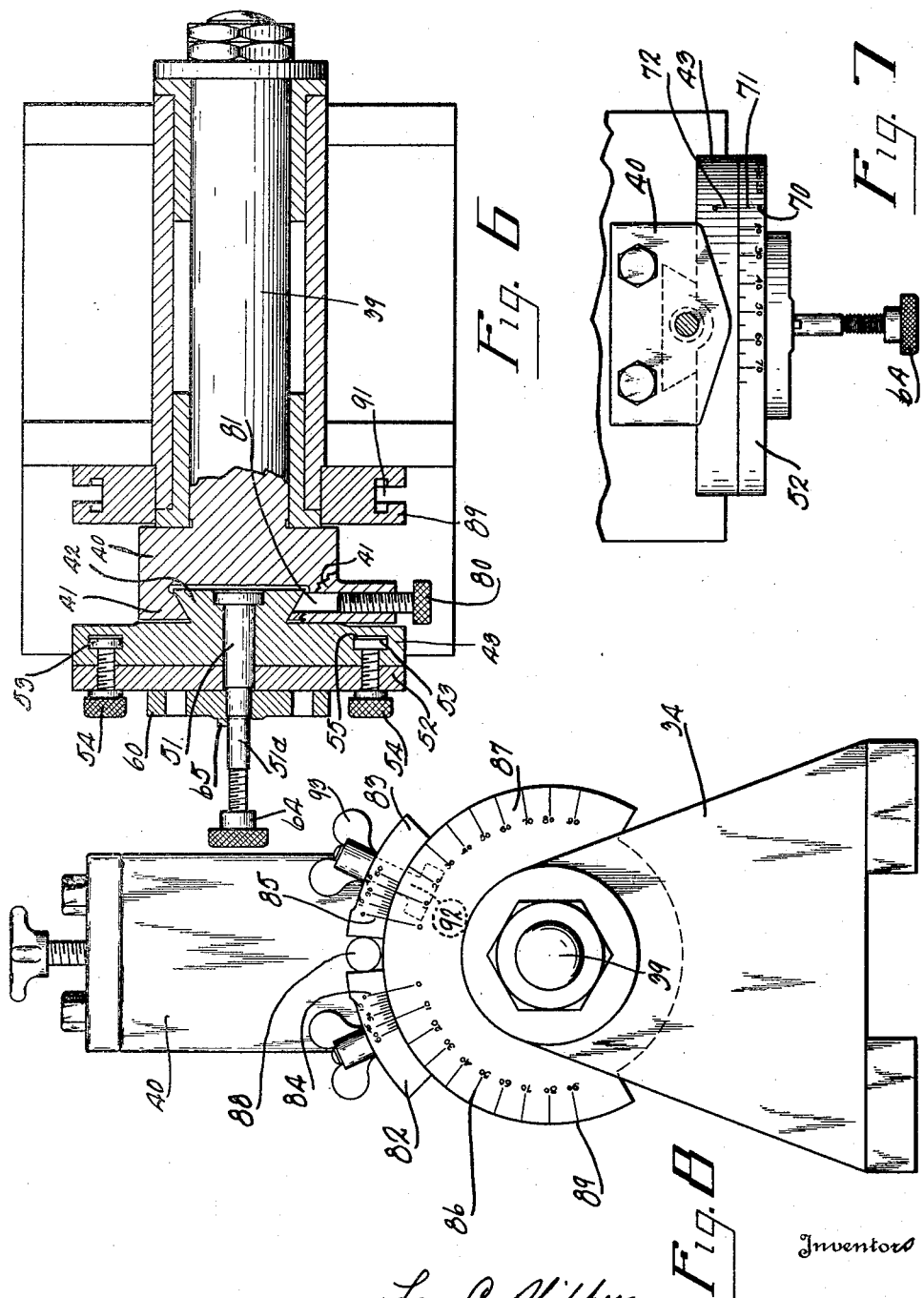

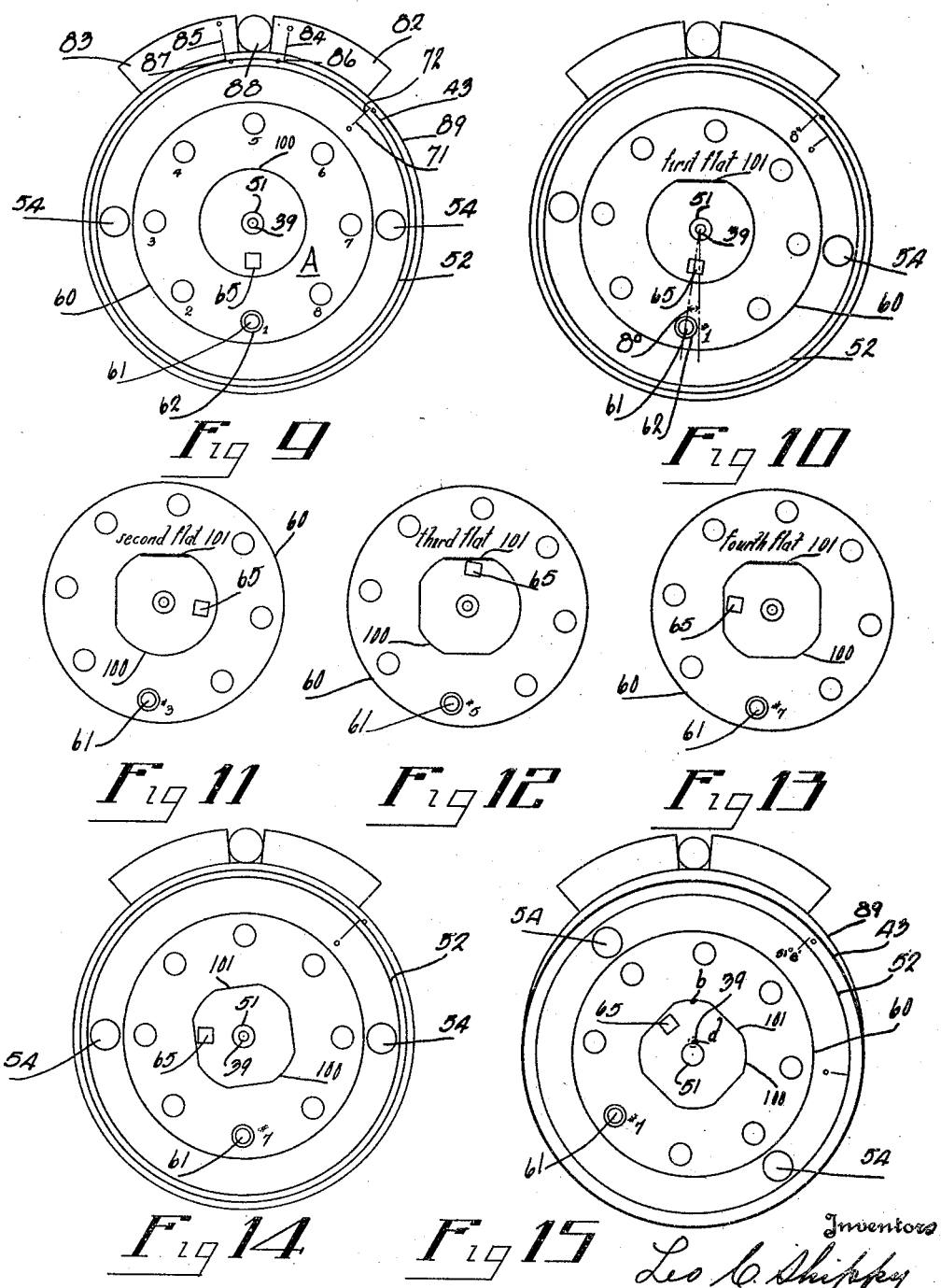

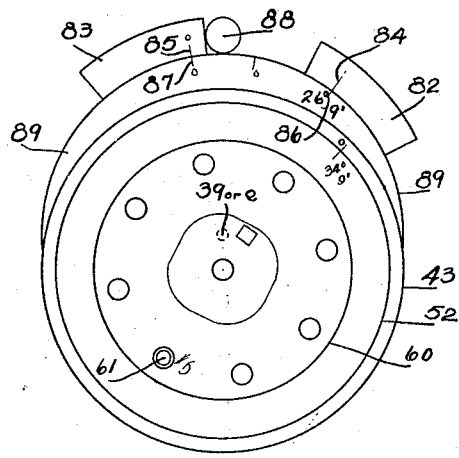
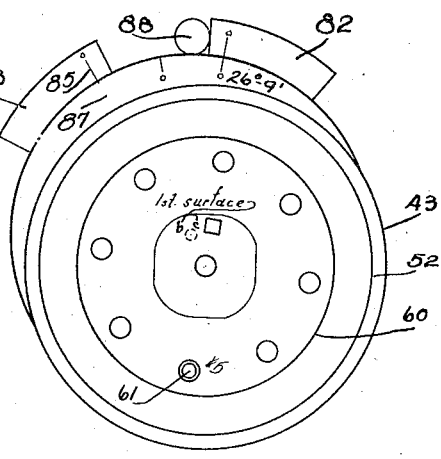
Fig 23    Fig 24
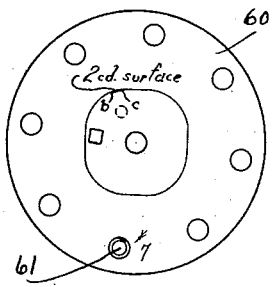
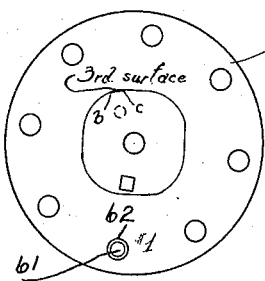
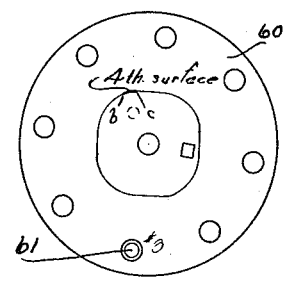
Fig 25    Fig 26    Fig 27

Patented Aug. 23, 1932

1,873,224

UNITED STATES PATENT OFFICE

LEO C. SHIPPY AND JOHN Q. HOLMES, OF ANDERSON, INDIANA, ASSIGNORS TO DELCO-REMY CORPORATION, OF ANDERSON, INDIANA, A CORPORATION OF DELAWARE

CAM GRINDING FIXTURE

Application filed November 19, 1930. Serial No. 496,600.

This invention relates to the manufacture of rotary cams such as, for example, cams for operating the periodic circuit make and break apparatus employed in the ignition distributors for internal combustion engines. Heretofore it has been the practice of manufacturers of ignition distributor cams to produce these cams by a grinding machine, the movable arbor of which is controlled by a master control cam several times larger than the cam produced, the master control cam being made according to dimensions derived by empirical formulæ based on the dimensions proscribed for the ignition distributor cam. The master control cam not being even an enlarged scale reproduction of the ignition distributor cam, there was no way of determining accurately in advance whether or not the master control cam when mounted in the production cam grinding apparatus would so control the apparatus that the cams produced would have the required dimensions. Furthermore, there was no way of determining in advance of the making of the master control cam whether or not an ignition distributor cam would, if made exactly according to proscribed dimensions, produce the desired results.

It is therefore an object of the present invention to provide means for making a full size precision model of ignition distributor cams according to the exact dimensions proscribed by the cam designing engineer in order to determine whether or not an ignition distributor using the precision model will give the desired result. This precision model is to be used according to an improved method and as a control cam for use with a precision cam grinding machine described and claimed in our copending application, Serial No. 495,628, filed November 14, 1930. A second precision grinding machine disclosed in our copending application referred to uses the master control cam in the production of cams which will be substantially duplicates of the precision models.

Further objects and advantages of the present invention will be apparent from the following description, reference being had to the accompanying drawings wherein a preferred embodiment of one form of the present invention is clearly shown.

In the drawings:

Fig. 1 is a front-side perspective view of a cam blank supporting fixture adapted to be attached to the bed of a grinding machine said fixture embodying the present invention.

Fig. 2 is an end view on an enlarged scale of a cam selected as an example to show how the fixture is used in producing a precision model cam. Dimensions have been applied to the cam shown in Fig. 2 to facilitate the explanation of the use of the cam grinding fixture.

Fig. 3 is a rear-side perspective view of the fixture.

Fig. 4 is a front view thereof.

Fig. 5 is a sectional view on line 5—5 of Fig. 4.

Fig. 6 is a sectional view on the line 6—6 of Fig. 4.

Fig. 7 is a fragmentary plan view looking in the direction of the arrow 7a, the part in section being a section on the line 7—7 of Fig. 5.

Fig. 8 is a rear-end view of the fixture.

Figure 16:
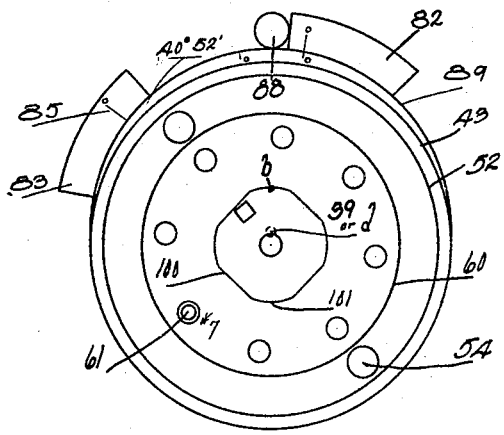
Figure 17:
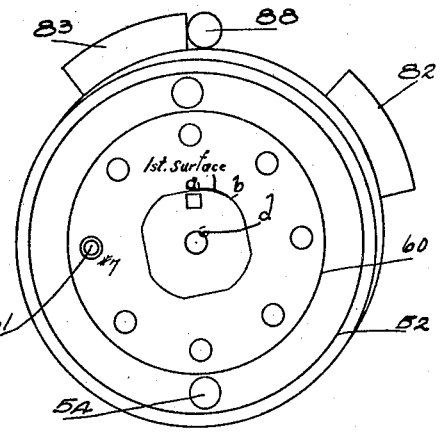
Figure 18:
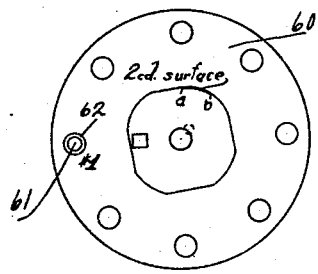

Figs. 9 to 27 inclusive are diagrams illustrating the use of the fixture, these diagrams being related to parts visible from the front of the fixture as shown in Fig. 4, for example.

Referring to Figs. 1 and 3, 30 designates the horizontally movable bed of a grinding machine and 31 is the rotatable grinding machine located above the bed 30 in such position that work properly located upon the bed may be moved with the bed into contact with the grinding wheel. The work holding fixture comprises a frame 32 comprising a base 33 to which uprights 34 are attached by welding at 35, the uprights 34 being joined by welding at 36 to a tube 37 into which bearing bushings 38 are press fitted. The bearings 38 support a shaft 39 carrying a head 40. The shaft 39 receives nuts 39a which may be tightened against a washer 39b to take up end play at the shaft 39. The head 40 provides ways or rails 41 for guiding the dove-tail shaped extension 42 of a slide 43.

The slide 43 is caused to move along the ways 41 by turning a knob 44 attached to a screw 45 threaded through a block 46 attached by bolts 47 to the head 40. The screw 45 terminates in a grooved block 48 received by a recess 49 in the slide 43 and secured therein by a pin 50 (see Fig. 4), said pin permitting the turning of the block 48 relative to the slide 43. The slide 43 is generally cylindrical in shape and carries axially thereof a fixed rod 51 providing a bearing for an index plate 52 which may be clamped to the slide 43 in various positions of angular adjustment relative thereto by the use of two clamping screws 53 and cooperating nuts 54, shown particularly in Fig. 6. The slide 43 is provided with an annular slot 55 of T-shaped cross section adapted to receive the head of the screw 53, said head being square or provided with flats to prevent turning in the slot 55. The rod 51 provides a bearing for a second index plate 60 which may be connected with the index plate 52 in various positions of angular adjustment by a peg 61 which fits any one of an annular row of holes 62 in the index plate 60 and a single hole 63 provided by the index plate 52. The hole 63 will be vertically below the axis of the rod 51 in the normal position of the fixture, that is, when certain graduated scale and indices to be described are in zero registration.

The outer end of the rod 51 is threaded to receive a nut 64 by which a cam blank A which fits snugly with the part 51a of the rod 51 may be clamped against the index plate 60 and the plate 60 against the index plate 52. As well known to those skilled in the art of ignition distributors, the cam drives the distributor rotor through a tongue and notch connection, the tongue being provided by the distributor and the notch by the cam. This tongue and notch connection provides means for locating the distributor rotor correctly with respect to the lobes of the cam. Accordingly, the index plate 62 provides a projection or a tongue 65 received by a notch 66 of the cam blank A as shown in Fig. 2. Therefore, before tightening the screw 64 the blank A must be properly located with its notch received by the tongue 65 of the index plate 60. The index plate 60 shown is provided with a circular row of eight holes 62 thereby adapting the plate 60 for indexing a cam blank to be formed into a cam having either two, four or eight lobes. If a cam having three, six or twelve lobes is required, it is obvious that another index plate 60 having twelve holes 62 may be substituted.

Referring to Fig. 7, it will be noted that the index plate 52 carries a scale 70 reading in degrees on either side of the zero mark 71. The slide 43 carries a zero mark index 72 cooperating with the scale 70.

The slide 43 provides a plane finished surface 75 parallel with the plane finished surface 76 of a stop block 77 attached by screws 78 to the slide 40. Between the surfaces 75 and 76 there may be inserted blocks 79 of various thickness. One of these blocks such as the one shown in Fig. 5 is of such thickness that when placed between the surfaces 75 and 76 the downward movement of the slide 43 will be so limited that when it can move no further downwardly, the axis of the rod 51 will be in horizontal alignment with the axis of the shaft 39. Other blocks 79 may be substituted for the one shown, said other blocks being dimensioned to suit the particular cam desired to be produced. When the slide 43 has been adjusted into the desired position with respect to the head 40 it is secured in the desired position of adjustment by tightening screws 80 which cause blocks 81 to bear against the dove-tail shaped extension 42 of the slide 43 thereby clamping the slide 43 to the head 40.

The head 40 may be oscillated about the axis of the shaft 39 within certain predetermined limits which are determined by two adjustable stop blocks 82 and 83 adapted to be engaged by a stop pin 88 fixed to the head 40, said blocks being provided with vernier indices 84 and 85 respectively which cooperate with graduated scales 86 and 87 carried by a cylindrical stop block support 89 fixed to the frame tube 37 by welding as indicated at 90. The stop block support 89 is provided with an arcuate annular groove 91 which is T-shaped in cross section and which receives the heads of bolts 92 which pass through the stop block 82 and 83 respectively and which cooperate with wing nuts 93 to secure the blocks 82 and 83 to the support 89. When the zero marks of the blocks 82 and 83 coincide with the zero marks of the scales 86 and 87 respectively, as shown in Fig. 8, the stop pin 88 will be confined between the blocks 82 and 83 so that the head 40 cannot rotate in either direction, in other words, there is no lost motion between the pin 88 and the stop blocks 82 and 83. When the stop blocks are located as shown in Fig. 8 the head 40 will be located with its symetrical axis vertical, the axis of the pin 88 being vertically above the axis of the shaft 39. If, at the same time the zero marks 71 on the part 52 coincide to the zero mark 72 on the part 43 as shown in Fig. 7, the hole 63 on the index plate 52 will be vertically below the rod 51.

Having described the construction of our cam grinding fixture, we will now explain its mode of operation with reference to the grinding of a cam of certain dimensions which we have chosen merely as an illustration of the use of our fixture.

Referring to Fig. 2 which gives the dimensions of the cam selected as an example, it will be noted that the diameter across the lobes of the cam is .846 and that the cam has four equidistant flats 101 and that the diameter across the flats is .779. Each cam lobe is comprised of two cylindrical surfaces, one surface being represented by the arc $ab$ having a radius of .325, the center of the radius being at the point $d$ which is on an axis $xy$ passing through the axis of the cam and located at an angle of 45° with respect to the flats 101. The center $d$ is so located that the arc $ab$ is tangent to the flat 101 and the point $b$ is tangent to the circle 100 which represents the blank of .846 inches in diameter from which the cam is formed. The other cylindrical surface of the cam lobe is represented by the arc $bc$ which is tangent to the circle 100 and to the flat 101 which it joins. The radius of curvature is .120 inches and the center of curvature is represented by the point $e$. The locating notch 66 of the cam blank is located at an angle of 37° to the axis $xy$.

To begin with the zero indices must be located opposite the zero marks of the scales with which they cooperate. This is clearly indicated diagrammatically in Fig. 9. The axis of rod 51 must be in alignment with axis of shaft 39. This is accomplished by putting between surfaces 75 and 76 a gauge block of suitable dimensions and turning the screw 45 until downward movement of the slide 43 is stopped. For example the gauge block may be .6000 inches in thickness. The index plate 60 is turned until its locating tongue 65 is vertically below the rods 51. This will bring one of the holes 62 of the plate 60 in alignment with the index hole 63 of the plate 52. Then the peg 61 is inserted in these holes. For convenience in describing the use of the fixture, the hole 61 which is vertically below the locating tongue 65 will be called Hole No. 1 and the other holes 62 are numbered accordingly reading in a clockwise direction as shown in Fig. 9. The cam blank A having a cylindrical surface represented by the circle 100-.846 inches in diameter is placed upon the rod 51 and so located that its locating notch 66 will receive the tongue 65. Then the clamp nut 64 is tightened.

The nuts 54 are loosened and the index plate 52 is turned clockwise until the 8 degree mark on its scale 70 located counterclockwise relative to the zero mark of the scale 70 is located adjacent the zero mark 72 of the slide 43. Then the table 30 is reciprocated horizontally and is intermittently fed vertically upwardly by suitable means well known to those skilled in the art of grinding machines in order that the grinding wheel 31 will grind the first flat 101. The grinding operation continues until the micrometer reading across the first flat 101 and the diametrically opposite cylindrical surface 100 measures .8100 inch. The peg 61 is removed and the index plate 60 is turned so that hole 62, No. 3 is located in alignment with hole 63 and the peg 61 is inserted as shown in Fig. 11. The second flat 101 is ground until the micrometer between this flat and the opposite cylindrical surface of the cam blank 100 measures .8100 inch. The peg 61 is again removed and the plate 60 is turned to bring hole 62 No. 5 in alignment with index hole 63 and the peg 61 is inserted as shown in Fig. 12. The third flat 101 is ground until the micrometer reading between the first and third flats is .7790 inch. The peg 61 is removed and the plate 60 is rotated in order to bring hole 62 No. 7 in alignment with index hole 63 and the peg 61 is inserted as shown in Fig. 13. The grinding operation is performed to form the fourth flat 101 which is spaced from the second flat at a distance of .7790 inch. This operation completes the grinding of the four flats 101 of the cam. Before adjusting the fixture for the next series of operations, the nuts 54 are loosened, the plate 52 is turned so that the zero mark 71 of its scale 70 will be opposite the zero mark 72 of slide 43, and the nuts 54 are tightened again. This condition of the fixture is shown in Fig. 14.

The screws 80 which clamp the slide 43 to the head 40 are loosened and the screw 45 is turned to permit removal of the point .6000 inch of the set block 79, and the substitution of a set block .5020 inch thick. Then the slide 43 is screwed down upon the .5020 inch block as far as it will go, and the screws 80 are turned to clamp the slide 43 to the head 40. The nuts 54 are loosened and the plate 52 is turned clockwise relative to the slide 43 until the mark 51° 8′ of the scale 70 coincides with the zero mark 72 of slide 43. Then the nuts 54 are tightened to clamp the plate 52 to the slide 43 in this position. This condition of the fixture is shown in Fig. 16. The axis of the rod 51 will be located vertically below the axis of shaft 39 by an amount equal to the difference between .600 and .5020 or .0980 inch. The relative location between rod 51 and shaft 39 is shown in Fig. 15. The axis of shaft 39 also represents the center $d$ referred to in Fig. 2 which is the center of curvature of the cylindrical surface $ab$ the radius of which is .325 inch. It will be noted that when the amount .098 inch referred to above is added to the radius .325 inch the total is .423 inch or one-half of .846 inch which was the diameter of the cam blank 100. Therefore it is apparent that the point $b$ will be tangent to the cam blank circle 100 indicated in Fig. 2, and will be located vertically above the point $d$ when the fixture has been adjusted as shown in Fig. 15. Referring to Fig. 16, the stop block 83 is loosened and is moved counterclockwise as viewed in Fig. 16 or as viewed from the front of the fixture and clockwise as viewed in Fig. 8 until the zero mark of the scale 85 registers with the 40° 52′ mark of the scale 87 of the stop support 89. Without changing the vertical height of the table 30, the table is moved so that the blank will be directly under the wheel 31 with the point $b$ tangent to the periphery of the wheel. Then the head 40 is rotated from the position shown in Fig. 16 to that shown in Fig. 17 in order that the surface $ab$ will be ground as the stop 83 is caused to move into engagement with the stop 88. This is the first surface $ab$.

Figure 19:
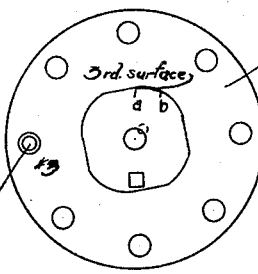
Figure 20:
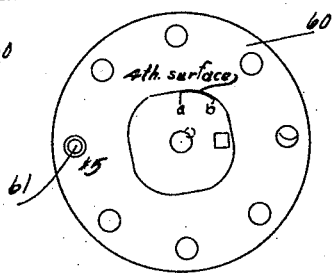
Figure 21:
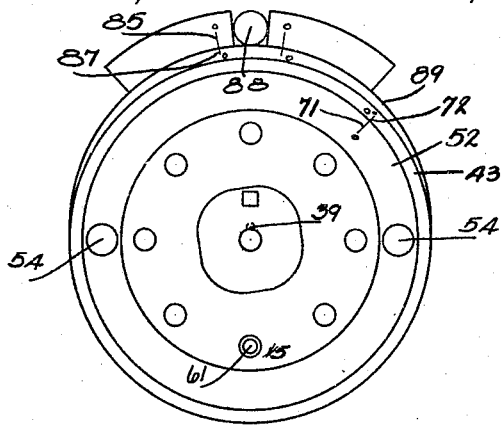

Before grinding the second surface $ab$ the pin 61 is removed from hole 62 No. 7 and the plate 60 is rotated counterclockwise 90° in order to locate the hole 62 No. 1 in alignment with hole 63 of plate 52. Then the peg 61 is inserted in these aligned holes. Then the head is oscillated as before as explained with reference to Fig. 16 to grind the second surface $ab$. The third and fourth surfaces $ab$ shown diagrammatically in Figs. 19 and 20 are ground in a similar manner, peg 61 being used to tie hole 62 No. 3 of plate 60 to hole 63 of plate 52 preparatory to grinding the third surface $ab$ as shown in Fig. 19, and peg 61 being used to tie hole 62 No. 5 of plate 60 to hole 63 of plate 52 preparatory to grinding the fourth surface $ab$ as shown in Fig. 20.

Figure 22:
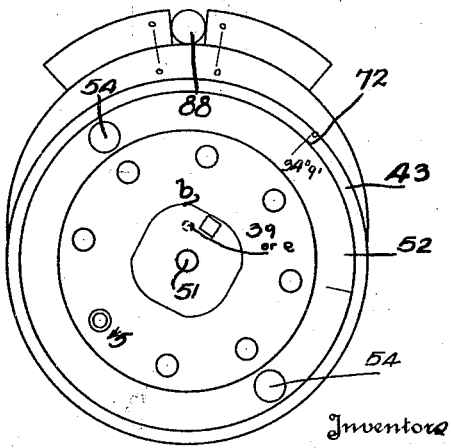

Before adjusting the fixture for performing the last series of operations which grind the four surfaces $bc$, the stop block 83 is returned to normal position with its zero mark of scale 85 coinciding with zero mark of scale 87 of support 89. The nuts 54 are loosened to permit the return of index plate 52 to normal position with the zero mark 71 of its scale 70 coinciding with zero mark 72 of slide 43. The vertical slide 43 is loosened by loosening the screws 80 and the screw 45 is turned upwardly to permit removal of the .5020 inch set block 79 and the substitution of a .2970 inch set block 79. The slide 43 is then moved downwardly to touch the block and is then clamped tight to the head 40. The knobs 54 are then loosened and the index plate 52 is turned relative to the slide 43 clockwise from the zero position until its 34° 9' scale mark coincides with the zero mark 72 of slide 43. Then the nuts 54 are tightened. Referring to Fig. 22 which shows the fixture after these adjustments have been made, it will be noted that the axis of rod 51 will be vertically below the axis of shaft 39 by an amount equal to the difference between .600 inch and .297 inch or .303 inch. Adding this amount to .120 inch which is the radius of curvature of the surface $bc$ will give the sum .423 inch or one-half of .846 inch which is the diameter of the cam blank circle 100. Therefore, it is apparent that the small circle 39 in Fig. 22 represents the point $e$ shown in Fig. 2 which is the center of curvature of the surface $bc$. It is apparent from the foregoing calculations that point $b$ of the surface $bc$ is located on the cam blank circle 100 and continues from the surface $ab$.

The stop block 82 is unclamped on the support 89 and is moved in a clockwise direction as viewed in Fig. 23 or counterclockwise as viewed in Fig. 8 in order to bring the zero mark of its scale 84 opposite the 26° 9' mark of scale 86 of stop support 89. Then the head is rotated counterclockwise about the axis of shaft 39 which coincides with center point $e$ shown in Fig. 2 in order to move the stop 83 away from the stop 88 and the stop 82 into engagement with the stop 88 as shown in Fig. 24 and thus grind the first surface $bc$. Before grinding the second surface $bc$ the peg 61 is removed from hole 63 of plate 52 and hole 62 No. 5 of plate 60 and plate 60 is rotated counterclockwise 90° as viewed in Fig. 4 in order to bring hole 62 No. 7 into alignment with hole 63 of plate 52, and then the peg 61 is inserted in the aligned holes. Then the oscillation of the head 40 is repeated in order to grind the second surface $bc$ in the same manner which was described with respect to Fig. 24. The third surface $bc$ is ground in like manner using the peg 61 in hole 62 No. 1 of plate 60 as shown in Fig. 26. The fourth surface $bc$ is ground in like manner using the peg 61 in hole 62 No. 3 as shown in Fig. 27. This series of operations completes the grinding of cam A according to dimensions shown in Fig. 2.

The cam A is now ready to be tested for the accuracy of its dimensions and for performance when used in an ignition distributor. If found to give satisfactory performance the cam A is then used as a control cam for use in a precision grinding machine which grinds the master control cam for making production cams as disclosed in our co-pending application referred to.

While the form of embodiment of the present invention as herein disclosed, constitutes a preferred form, it is to be understood that other forms might be adopted, all coming within the scope of the claims which follow.

What is claimed is as follows:

1. A cam grinding fixture comprising, in combination, a frame for supporting the fixture upon the movable table of a grinder, a shaft journalled in said frame and located parallel to the plane of the grinder table, a head carried by the shaft, a slide slidably guided by the head at right angles to the axis of the shaft, means for securing the slide to the head in various positions of linear adjustment, an index plate pivotally carried by the slide, means securing the index plate to the slide in various positions of angular adjustment, a second index plate rotatably supported by the first index plate and located coaxially therewith, means for securing the second index plate to the first index plate in various positions of angular adjustment, means for securing a cam blank to the second index plate, and adjustable stops for variably limiting rotation of the head.

2. A cam grinding fixture according to claim 1 in which the slide is moved relative to the head by cooperating screw and nut members one of which is attached to the head and the other to the slide.

3. A cam grinding fixture according to claim 1 in which the head supports a rod providing a pivotal support for both index plates and for a tubular cam blank and the rod has a threaded end cooperating with a nut by which the blank and the second index plate are clamped to the slide.

4. A cam grinding fixture according to claim 1 in which the second index plate provides a locating part engageable with a locating part of the cam blank and is provided with a circular row of indexing holes corresponding in number and spacing to the lobes of the cam to be made from the blank, each of said holes being locatable in alignment with a hole provided by the first index plate, and in which a pin is passed into aligned holes in the index plates to secure them together in a certain angular relation.

5. A cam grinding fixture according to claim 1 in which the frame provides arcuate stop supporting surfaces concentric with respect to the shaft, in which arcuate stop blocks may be secured to said surfaces in various positions of angular adjustment, and in which a projection from the head extends into a space between adjacent end surfaces of the stop blocks.

6. A cam grinding fixture comprising, in combination, a frame for supporting the fixture upon the movable table of a grinder, a head rotatably supported by the frame, a slide carried by the head and linearly adjustable thereon in a direction at right angles to the axis of rotation of the head, a rod supported by the slide and extending with its axis parallel to the axis of the head, the rod being located so that its axis may be moved into or out of alignment with the axis of the head by moving the slide, and means for securing a tubular cam blank upon the rod in various positions of angular adjustment relative to the slide.

In testimony whereof we hereto affix our signatures.

LEO C. SHIPPY.
JOHN Q. HOLMES.